US009482154B2

(12) United States Patent
Van Niekerk et al.

(10) Patent No.: US 9,482,154 B2
(45) Date of Patent: Nov. 1, 2016

(54) EXHAUST GAS COLLECTOR FOR AN EXHAUST AFTERTREATMENT SYSTEM

(71) Applicants: CUMMINS POWERGEN IP, INC., Minneapolis, MN (US); CUMMINS CAL PACIFIC, LLC, Irvine, CA (US)

(72) Inventors: Herman Van Niekerk, Fullerton, CA (US); Claude M. Johnson, Columbus, IN (US)

(73) Assignees: Cummins Cal Pacific, LLC, Irvine, CA (US); Cummins PowerGen IP, Inc., Minneapolis, MN (US)

( * ) Notice: Subject to any disclaimer, the term of this patent is extended or adjusted under 35 U.S.C. 154(b) by 872 days.

(21) Appl. No.: 13/706,057

(22) Filed: Dec. 5, 2012

(65) Prior Publication Data

US 2014/0150433 A1 Jun. 5, 2014

(51) Int. Cl.
*F02C 7/00* (2006.01)
*F01D 25/30* (2006.01)
*F01N 13/00* (2010.01)

(52) U.S. Cl.
CPC ................ *F02C 7/00* (2013.01); *F01D 25/30* (2013.01); *F01N 13/008* (2013.01); *F01N 2560/00* (2013.01); *F01N 2560/025* (2013.01); *F01N 2560/026* (2013.01); *F05D 2270/083* (2013.01)

(58) Field of Classification Search
CPC ............. F01D 25/30; F05D 2270/083; F01N 2560/00–2560/028; F01N 2560/05; F01N 13/008; G01N 1/2247; G01N 2001/225; G01N 1/2258; G01N 2001/2285; G01N 1/26
USPC ........................................ 73/863.71; 60/39.5
See application file for complete search history.

(56) References Cited

U.S. PATENT DOCUMENTS 3,092,757 A 6/1963 Rosenfeld et al.
3,749,130 A 7/1973 Howitt et al.

(Continued)

FOREIGN PATENT DOCUMENTS

DE 10203310 A1 7/2003
DE 1034875 A1 5/2004

(Continued)

OTHER PUBLICATIONS

"Control of Emissions of Air Pollution From Nonroad Diesel Engines and Fuel", Environmental Protection Agency, Federal Register, vol. 69, No. 124, Jun. 29, 2004, 316 pages.

(Continued)

*Primary Examiner* — Phutthiwat Wongwian
*Assistant Examiner* — Stefan Ibroni

(57) ABSTRACT

An exhaust gas collector for use in a duct of an exhaust gas aftertreatment system includes generally T-shaped tubular sample members having closed upstream ends, downstream ends and spaced apart exhaust collection holes. The downstream ends of the tubular members are fluidly coupled at a common collection location in the center of the duct. The tubular members are positioned in the duct with the exhaust collection holes at locations distributed across a cross sectional area of a duct to collect exhaust samples from across the cross sectional area of the duct. All exhaust gas samples collected by the exhaust gas collector are collected by one of the sample members having a downstream end coupled to the common collection location. A non-sample collecting accumulator tube is fluidly coupled to the common collection location of the tubular sample members. A sensor senses the mixed exhaust gas in the accumulator tube.

20 Claims, 12 Drawing Sheets

142 258 280 252 256 254 270 250 272 252

142 258 280 260 282 264 262

(56) References Cited

U.S. PATENT DOCUMENTS

| | | | | |
|---|---|---|---|---|
| 3,842,678 | A * | 10/1974 | De Baun | G01N 1/2247 73/863.03 |
| 4,047,437 | A | 9/1977 | Brooks | |
| 4,111,778 | A | 9/1978 | Davis et al. | |
| 4,219,738 | A | 8/1980 | Griesinger | |
| 4,243,893 | A | 1/1981 | Sten | |
| 4,534,213 | A | 8/1985 | Mirikidani | |
| 4,608,946 | A | 9/1986 | Tanaka et al. | |
| 4,733,750 | A | 3/1988 | Poirier et al. | |
| 4,835,405 | A | 5/1989 | Clancey et al. | |
| 4,907,546 | A | 3/1990 | Ishii et al. | |
| 5,155,995 | A | 10/1992 | Kinnear et al. | |
| 5,694,889 | A | 12/1997 | Ball et al. | |
| 5,703,299 | A | 12/1997 | Carleton et al. | |
| 6,028,369 | A | 2/2000 | Hirose et al. | |
| 6,401,455 | B1 | 6/2002 | Mathes et al. | |
| 6,450,133 | B1 | 9/2002 | Bernard et al. | |
| 6,630,756 | B2 | 10/2003 | Kern et al. | |
| 6,784,574 | B2 | 8/2004 | Turner et al. | |
| 6,843,104 | B2 | 1/2005 | Busch | |
| 6,865,883 | B2 | 3/2005 | Gomulka | |
| 6,895,903 | B2 | 5/2005 | Campion | |
| 6,904,815 | B2 * | 6/2005 | Widmer | G01N 1/2258 73/863.03 |
| 6,976,397 | B2 | 12/2005 | Widmer | |
| 7,007,966 | B2 | 3/2006 | Campion | |
| 7,314,397 | B2 | 1/2008 | Sodemann et al. | |
| 7,415,901 | B2 | 8/2008 | Desrochers et al. | |
| 7,434,448 | B2 | 10/2008 | Weyl et al. | |
| 7,467,749 | B2 | 12/2008 | Tarabulski et al. | |
| 7,482,705 | B2 | 1/2009 | Piercey, III | |
| 7,587,950 | B2 | 9/2009 | Liu et al. | |
| 7,587,951 | B2 | 9/2009 | Liu et al. | |
| 7,665,797 | B1 | 2/2010 | Brosseau | |
| 8,146,349 | B2 | 4/2012 | Bloms et al. | |
| 8,196,555 | B2 | 6/2012 | Ikeda et al. | |
| 8,327,623 | B2 | 12/2012 | Raman | |
| 8,341,936 | B2 | 1/2013 | Zhang | |
| 8,459,216 | B2 | 6/2013 | Klejeski et al. | |
| 8,826,649 | B2 | 9/2014 | Li et al. | |
| 9,010,096 | B2 | 4/2015 | Golin et al. | |
| 2002/0119081 | A1 | 8/2002 | Latino et al. | |
| 2003/0093992 | A1 | 5/2003 | Suga et al. | |
| 2003/0106309 | A1 | 6/2003 | Morimoto et al. | |
| 2004/0099475 | A1 | 5/2004 | Schulte | |
| 2004/0172935 | A1 | 9/2004 | Otake et al. | |
| 2004/0226287 | A1 | 11/2004 | Edgar et al. | |
| 2006/0080971 | A1 | 4/2006 | Smith et al. | |
| 2007/0130923 | A1 | 6/2007 | Dye et al. | |
| 2007/0132243 | A1 | 6/2007 | Wurtele et al. | |
| 2007/0214862 | A1 | 9/2007 | Kubinski et al. | |
| 2008/0129053 | A1 | 6/2008 | Piercey | |
| 2008/0276599 | A1 | 11/2008 | Hosaka | |
| 2008/0311010 | A1 | 12/2008 | Boe | |
| 2009/0044524 | A1 | 2/2009 | Fujino | |
| 2009/0173063 | A1 | 7/2009 | Boorse et al. | |
| 2010/0005791 | A1 | 1/2010 | Ranganathan et al. | |
| 2010/0023200 | A1 | 1/2010 | Kurrle et al. | |
| 2010/0064662 | A1 | 3/2010 | Hinz et al. | |
| 2010/0071351 | A1 | 3/2010 | Nishimur et al. | |
| 2010/0082224 | A1 | 4/2010 | Stretch | |
| 2010/0186373 | A1 | 7/2010 | Pierz et al. | |
| 2010/0300083 | A1 | 12/2010 | Uemoto | |
| 2010/0312445 | A1 | 12/2010 | Bogema et al. | |
| 2011/0000194 | A1 | 1/2011 | Gonze et al. | |
| 2011/0023452 | A1 | 2/2011 | Gisslen et al. | |
| 2011/0107812 | A1 | 5/2011 | Kasahara | |
| 2011/0146253 | A1 | 6/2011 | Isada et al. | |
| 2011/0214415 | A1 | 9/2011 | Thomas | |
| 2011/0214643 | A1 | 9/2011 | Blizard et al. | |
| 2011/0232611 | A1 | 9/2011 | Shaikh et al. | |
| 2011/0248511 | A1 | 10/2011 | Marlenee et al. | |
| 2012/0003131 | A1 | 1/2012 | Ibrahim et al. | |
| 2012/0121475 | A1 | 5/2012 | van Niekerk | |
| 2012/0160934 | A1 | 6/2012 | Ponnathpur et al. | |
| 2012/0173062 | A1 | 7/2012 | Madurai Kumar et al. | |
| 2012/0180457 | A1 | 7/2012 | Liu et al. | |
| 2012/0204542 | A1 | 8/2012 | Norris et al. | |
| 2012/0208672 | A1 | 8/2012 | Sujan et al. | |
| 2013/0213013 | A1 | 8/2013 | Mitchell et al. | |
| 2013/0333355 | A1 | 12/2013 | Lee et al. | |
| 2014/0150407 | A1 | 6/2014 | Van Niekerk et al. | |
| 2014/0150408 | A1 | 6/2014 | Van Niekerk et al. | |
| 2014/0150433 | A1 | 6/2014 | Van Niekerk et al. | |
| 2014/0154139 | A1 | 6/2014 | Van Niekerk et al. | |

FOREIGN PATENT DOCUMENTS

| | | | |
|---|---|---|---|
| EP | 0978721 | A1 | 2/2000 |
| EP | 1612916 | A1 | 1/2006 |
| EP | 1978241 | B1 | 10/2008 |
| JP | 03-199613 | | 8/1991 |
| JP | 6501760 | B2 | 2/1994 |
| JP | 08-291708 | | 11/1996 |
| JP | 2004132766 | A | 4/2004 |
| JP | 2008267232 | A | 11/2008 |
| JP | 2010276549 | A | 12/2010 |
| WO | WO2008079003 | A1 | 7/2008 |
| WO | WO2012033704 | A2 | 3/2012 |
| WO | 2014089172 | A1 | 6/2014 |
| WO | 2014089173 | A1 | 6/2014 |

OTHER PUBLICATIONS

40 CFR Chapter 1 (Jul. 1, 2012 Edition), Part 1039—Control of Emissions from New and In-Use Nonroad Compression-Ignition Engines, 80 pages.

Tier 4 Regulations Affect More than Engines, Jun. 6, 2011, downloaded from http://www.power-eng.com/articles/pring/volume-115/issue-6/features/tier-4-regulations-af.

International Search Report issued in International Application No. PCT/US2013/073043, mailed Apr. 28, 2014, 2 pages.

International Search Report issued in International Application No. PCT/US2013/073048, mailed Apr. 28, 2014, 2 pages.

International Preliminary Examination Report issued in PCT/US2013/073043, completed Jun. 9, 2015, 18 pages.

International Preliminary Examination Report issued in PCT/US2013/073048, completed Jun. 9, 2015, 11 pages.

European Application No. 13154457.9 Search Report dated May 7, 2013.

* cited by examiner

EXHAUST GAS COLLECTOR FOR AN EXHAUST AFTERTREATMENT SYSTEM

TECHNICAL FIELD

The present invention relates generally to engine exhaust aftertreatment systems for diesel-powered generators and more particularly to an exhaust gas collector for use in such an aftertreatment system.

BACKGROUND

Exhaust emissions from internal combustion engines are a significant contributor to pollution in the environment. In particular, nitric oxide (NOx) emissions contribute to smog and acid rain. NOx, which includes both nitrogen oxide and nitrogen dioxide, is a byproduct of the combustion of fossil fuels, and diesel engines are regarded as a major generator of NOx. Diesel engines can also be a significant source of soot and other particulate matter.

To reduce the levels of soot and other particulate matters emitted into the atmosphere, the exhaust systems of diesel engines include a system for removing these materials. A Diesel Particulate filter (DPF) physically captures soot and other particulate matter in the diesel exhaust. The captured material can then be combusted once captured if the aftertreatment system is operated at a sufficiently high temperature.

To reduce the levels of NOx emitted into the atmosphere, the exhaust systems of diesel engines include a system for the Selective Catalytic Reduction (SCR) of NOx in which a urea solution is injected in the exhaust stream upstream of the catalytic converter. After injection into the exhaust stream, the urea solution evaporates and mixes with the exhaust stream. The urea decomposes while in the exhaust system and hydrolyzes into ammonia. NOx then reacts with the thus generated ammonia in the presence of the catalyst and is catalytically reduced to non-polluting nitrogen, water and carbon dioxide.

There is an ongoing desire to further reduce exhaust emissions. Accordingly, there is an ongoing need for improvements in exhaust treatment systems.

SUMMARY

The present invention pertains to an improved exhaust treatment system. In some embodiments, the invention pertains to an exhaust aftertreatment system that includes a duct having an inlet region, an outlet region and a cross sectional area. An exhaust gas collector is in the duct and includes a plurality of tubular sample members having upstream ends, downstream ends and one or more spaced apart exhaust collection holes. The downstream ends of the tubular members are fluidly coupled at a common collection location. The tubular members are positioned in the duct with the exhaust collection holes at locations distributed across the cross sectional area and are adapted to collect exhaust samples from the one or more exhaust collection holes from across the cross sectional area of the duct and communicate them through their downstream end coupled to the common collection location. A non-sample collecting accumulator tube is fluidly coupled to the common collection location of the tubular sample members such that the exhaust samples collected from all of the plurality of sample members are mixed in the accumulator tube. A sensor to sense the mixed exhaust gas is disposed in the accumulator tube.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
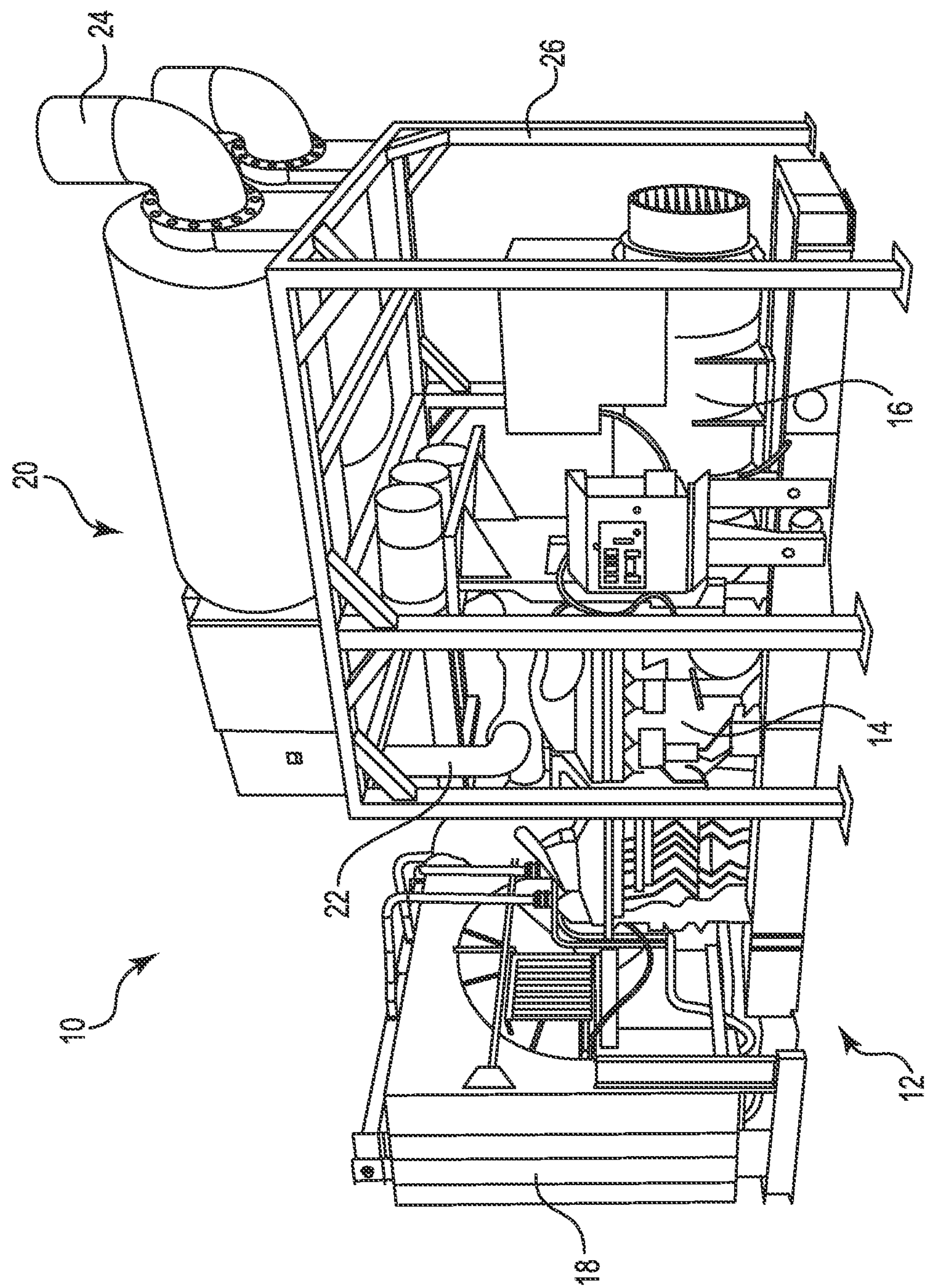
FIG. 1 is a perspective view of a diesel genset equipped with an exhaust aftertreatment system in accordance with embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

The present invention pertains generally but not exclusively to aftertreatment exhaust systems for stationary diesel-powered generators. These aftertreatment systems are configured to meet or exceed certain emissions standards, such as the present EPA Tier 4 Interim and Tier 4 Final requirements. Stationary diesel-powered generators tend to include substantial diesel engines that produce large volumes of exhaust that needs to be treated before release into the atmosphere. In some instances, the diesel engines powering the generators can be in the range of about 30 liters to about 78 liters or more in cylinder displacement. Often the exhaust ducts of such systems are also quite large in diameter and, as such, normal assumptions on the uniformity of the make-up of the exhaust system and uniform mixing of materials injected into the exhaust stream no longer apply. Accordingly, the aftertreatment exhaust systems described herein are configured to accommodate large volumes of diesel exhaust while minimizing the space requirements of the aftertreatment exhaust system.

FIG. 1 is a perspective view of a diesel genset system 10 that includes a genset 12 and an exhaust aftertreatment system 20. The genset 12 includes a diesel engine 14, an electrical generator 16 that is mechanically driven by the diesel engine 14 and a cooling system 18. The exhaust aftertreatment system 20 is fluidly connected to an exhaust outlet 22 coming from the diesel engine 14 and itself has an exhaust outlet 24. In between are several sections that will be described in greater detail with respect to subsequent drawings. In the illustrated embodiment, the exhaust aftertreatment system 20 is supported above the genset 12 via a support structure 26. The illustrated embodiment of system 10 utilizes the ceiling heights frequently found in generator rooms to minimize the overall footprint of the diesel genset system 10. In other embodiments, the exhaust aftertreatment system 20 can be located next to or behind the genset 12, or other locations.

Modern diesel exhaust aftertreatment systems utilize diesel particulate filter (DPF) to trap and oxidize soot and other particulate material in the exhaust stream. Such DPFs are typically coated with a catalyst material and are placed close to the engine so the high operation temperature so afforded combines with the catalyst coating to promote reduction of the particulate material. Diesel exhaust fluid (DEF) is generally injected and mixed into the exhaust stream after the DPF. The DEF is mixed with the exhaust gas stream and thermally decomposes to form ammonia ($NH_3$) which reacts with the NOx in the presence of a later selectively catalyzed reduction (SCR) catalyst to convert the NOx into nitrogen, water and small amounts of carbon dioxide.

DEF is typically not injected before the DPF due to the DPF's catalyst coating and high operating temperature, which would degrade the DEF and reduce its effectiveness. In addition, the relatively high levels of heat in the upstream exhaust tend to increase unwanted urea crystal growth on the DEF injection system and structures. As a result of this, DEF in modern diesel exhaust aftertreatment systems is typically injected after the DPF into a long section of exhaust duct that ensures that it is well mixed with the exhaust gases and sufficiently hydrolyzed into ammonia ($NH_3$) before entry into the later coupled SCR for catalytic reduction.

This need for mixing length increases with an increase in size of the diesel engine used, such as with those found in large stationary gensets, due to the general increase in the size of the exhaust duct. In addition, as the exhaust duct cross sectional area increases there is a tendency for the exhaust stream to mix less and remain more segregated in larger ducts. In part this is due to the aspect ratio between the duct cross section and the length of duct changing and getting smaller (i.e., the relative lengths versus cross sectional area of the exhaust ducts get shorter). As such, in large ducted systems, one can rely less and less on the assumption that the exhaust stream is uniform and mixing well for the purposes of sensing the composition of the exhaust or for injecting DEF. This has tended to increase the overall size and length of large displacement diesel exhaust aftertreatment systems to meet emissions requirements. For example, DEF mixing sections for ensuring uniform distribution of DEF into the exhaust streams of some large displacement diesel gensets have been required to be over 20 feet in length to facilitate the necessary turbulence and mixing. However, many customer applications and sites cannot easily accommodate such large and lengthy after treatment systems.

Embodiments of the present invention address these issues by using a short exhaust duct DEF mixing section with one or more turbulators placed in it that then flows into a relatively larger treatment housing. The activity of the turbulators and the rapid expansion afforded by the exhaust flow into the large housing mixes the DEF at an increased rate in a short distance. In addition, the use of the large housing allows a broadened front for treatment of the slowed exhaust gas flow that has been slowed by its entrance into the housing. In one embodiment this is accomplished by utilizing commodity DPF and SCR canisters in a large broad fronted replaceable sections. In another embodiment, the DEF injection is moved in front of the DPF, which uses uncatalyzed ceramic filter sections with an exhaust gas heater. The use of the exhaust gas heater allows the aftertreatment system to compensate for the lack of a catalyst on the DPF to oxidize particulate matter and yet allows for injection of DEF in front of the DPF by minimizing the decomposition of the DEF passing through the DPF and also by further mixing the DEF into the exhaust stream as it passes through.

Figure 2:
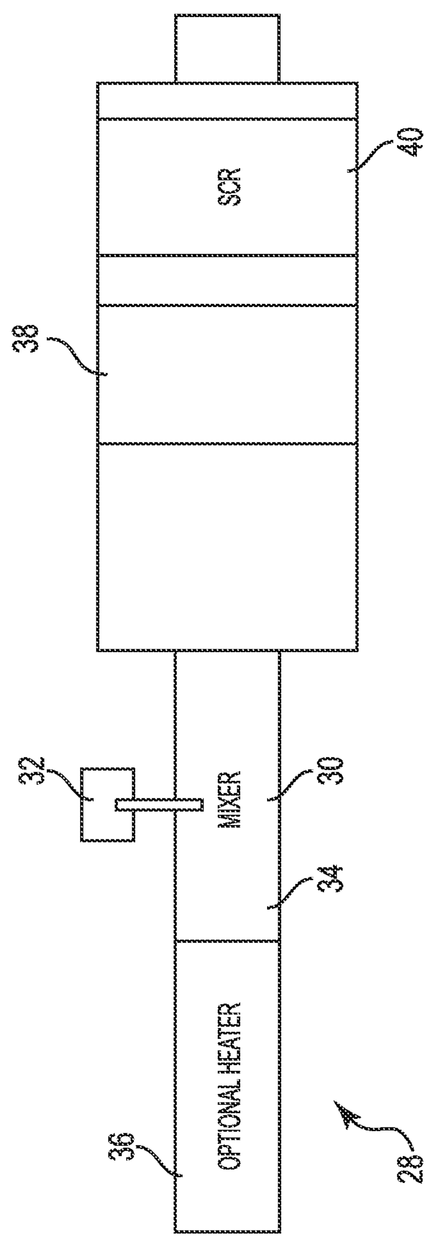
FIG. 2 is a schematic illustration of an exhaust aftertreatment system in accordance with embodiments of the present invention.

FIG. 2 is a schematic illustration of an exhaust aftertreatment system 28 in accordance with one embodiment of the invention. In the illustrated embodiment, the exhaust aftertreatment system 28 includes a diesel exhaust fluid (DEF) injection section 30 and a system housing 38. The DEF section 30 includes a DEF injector 32 that is configured to inject DEF into the exhaust stream passing through the exhaust aftertreatment system 28. In some embodiments, the DEF section 30 includes a mixer 34 that is configured to increase turbulence in the exhaust stream, thereby improving mixing and homogeneity of the DEF in the exhaust stream. While a single mixer 34 is indicated, in some embodiments the DEF section 30 may include a first mixer 34 located at an upstream side of the DEF section 30 and a second mixer (not illustrated) located at a downstream side of the DEF section 30.

In some embodiments, the exhaust aftertreatment system 28 may include an optional heater 36. Heater 36 is located at the upstream end of the DEF section 30 in the illustrated embodiment; if included, the heater 36 may be used to preheat the exhaust stream in order to improve the performance of the exhaust aftertreatment system 28. In some embodiments, the heater 36 is an electrical heater that is powered by the electrical output of the electrical generator 16. The heater 36, if included in a genset, can be used as an integrated load bank, serving to consume at least a portion of the electrical output of the electrical generator 16 (e.g., during periodic tests and qualification of the genset 12), avoiding the need and expense of purchasing and installing a separate load bank for this purpose and may allow control of the temperature of the exhaust to within plus or minus 10° F. of a desired operation point. For example, the heater 36 can optionally be operated in the manner disclosed in co-pending U.S. patent application Ser. No. 13/706,301 filed on even date herewith and entitled Integrated Load Bank And Exhaust Heater System For A Diesel Genset Exhaust Aftertreatment System, the entire disclosure of which is expressly incorporated herein by reference for all purposes.

The system housing 38 has an internal volume in which the exhaust travels that is larger than the exhaust duct of the DEF section 30 allowing for expansion and slowing of the exhaust gas stream and additional mixing of the exhaust gases and DEF. A Selective Catalyst Reduction (SCR) section 40 is located within the system housing 38 and is positioned such that exhaust traveling through the system housing 38 will pass through the SCR section 40. The SCR section 40 includes a catalyst that functions to remove NOx from the exhaust. DEF, which is can be an automotive grade urea-based solution, is injected into the exhaust stream via the DEF injector 32. The DEF thermally decomposes to form ammonia ($NH_3$) which reacts with the NOx in the presence of the SCR catalyst to convert the NOx into nitrogen, water and small amounts of carbon dioxide. In some embodiments, particularly if the system includes an SCR section 40 but no DPF section, the housing 38 may be referred to as an SCR section housing 40. In the illustrated embodiment, the exhaust will flow in a generally linear direction through the mixer 34 and housing 38. It is noted that the mixing of the exhaust gases and DEF by mixer 34 and the expansion from the exhaust duct of the DEF section 30 into the housing 38 promotes operation of the SCR catalyst 40 by providing as uniform mix as possible in the relatively short distance from the DEF Injector 32 to the SCR section 40 while slowing down the gas flow and providing a broad SCR catalyst front to more effectively treat the exhaust gases.

Figure 3:
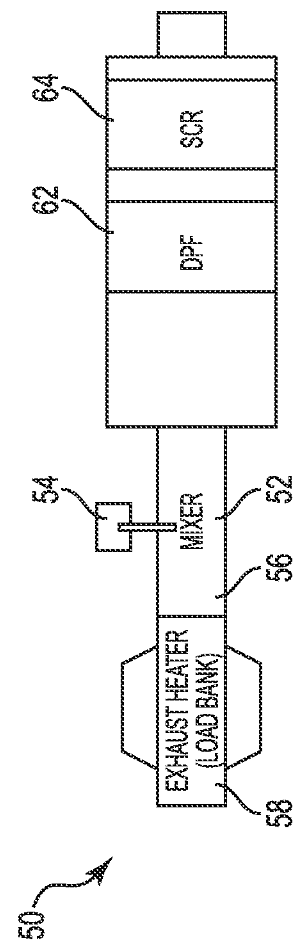
FIG. 3 is a schematic illustration of an exhaust aftertreatment system in accordance with embodiments of the present invention.

FIG. 3 is a schematic illustration of an exhaust aftertreatment system 50 in accordance with another embodiment of the invention. In the illustrated embodiment, the exhaust aftertreatment system 50 includes a diesel exhaust fluid (DEF) injection section 52 and a system housing 60. The DEF section 52 includes a DEF injector 54 that is configured to inject DEF into the exhaust stream passing through the aftertreatment exhaust system 50. The DEF section 30 includes a mixer 56 that is configured to increase turbulence in the exhaust stream. While a single mixer 56 is indicated, in some embodiments the DEF section 52 may include a first mixer 56 located at an upstream side of the DEF section 52 and a second mixer (not illustrated) located at a downstream side of the DEF section 52.

The exhaust aftertreatment system 50 includes a heater 58, which can used to preheat the exhaust stream and may allow control of the temperature of the exhaust to within plus or minus 10° F. of the desired operation point in order to improve the performance of the aftertreatment exhaust system 50. In some instances, the heater 58 is an electrical heater that is powered by the electrical output of the electrical generator 16 and may also serve as a load bank for the genset, serving to consume at least a portion of the electrical output of the electrical generator 16 during system testing or during periodic (e.g., weekly, montly) exercise mode operation to verify proper operation of the genset when used as a standby system, avoiding the need for the operator to purchase a separate load bank for this purpose.

The system housing 60 has an internal volume in which the exhaust travels that, again, expands rapidly from the downstream side of the DEF section 52 exhaust duct to further promote mixing of the exhaust gases and injected DEF while slowing down the gas flow and providing a broad front for the aftertreatment elements to effectively treat the exhaust gases. A Diesel Particulate Filter (DPF) section 62 is located within the system housing 60 and is positioned such that exhaust traveling through the system housing 60 will pass through the DPF section 62. The DPF section 62 includes one or more non-catalytic ceramic filters that function to physically trap soot and other particulate matter in one embodiment of the invention. By sufficiently heating the ceramic filters, the soot and other particulate matter can be combusted. Other embodiments of the invention have other DPF sections.

An SCR section 64 is positioned within the system housing 60, downstream of the DPF section 62. Accordingly, the DPF section 62 helps to keep the SCR section 64 cleaner, by preventing relatively large debris (soot and the like) from clogging the SCR section 64. DEF injected into the exhaust stream by the DEF injector 54 passes through the DPF section 62 and is thermally degraded, either before or after passing through the DPF section 62, into ammonia that reacts with the NOx in the presence of the SCR catalyst to convert the NOx into nitrogen, water and small amounts of carbon dioxide. DEF injection section 52 is located between the heater 58 and the housing 60 in the illustrated embodiment. The heater 58, the DEF injection section 52 and the housing 60 are also axially aligned for generally linear exhaust flow.

Figure 4:
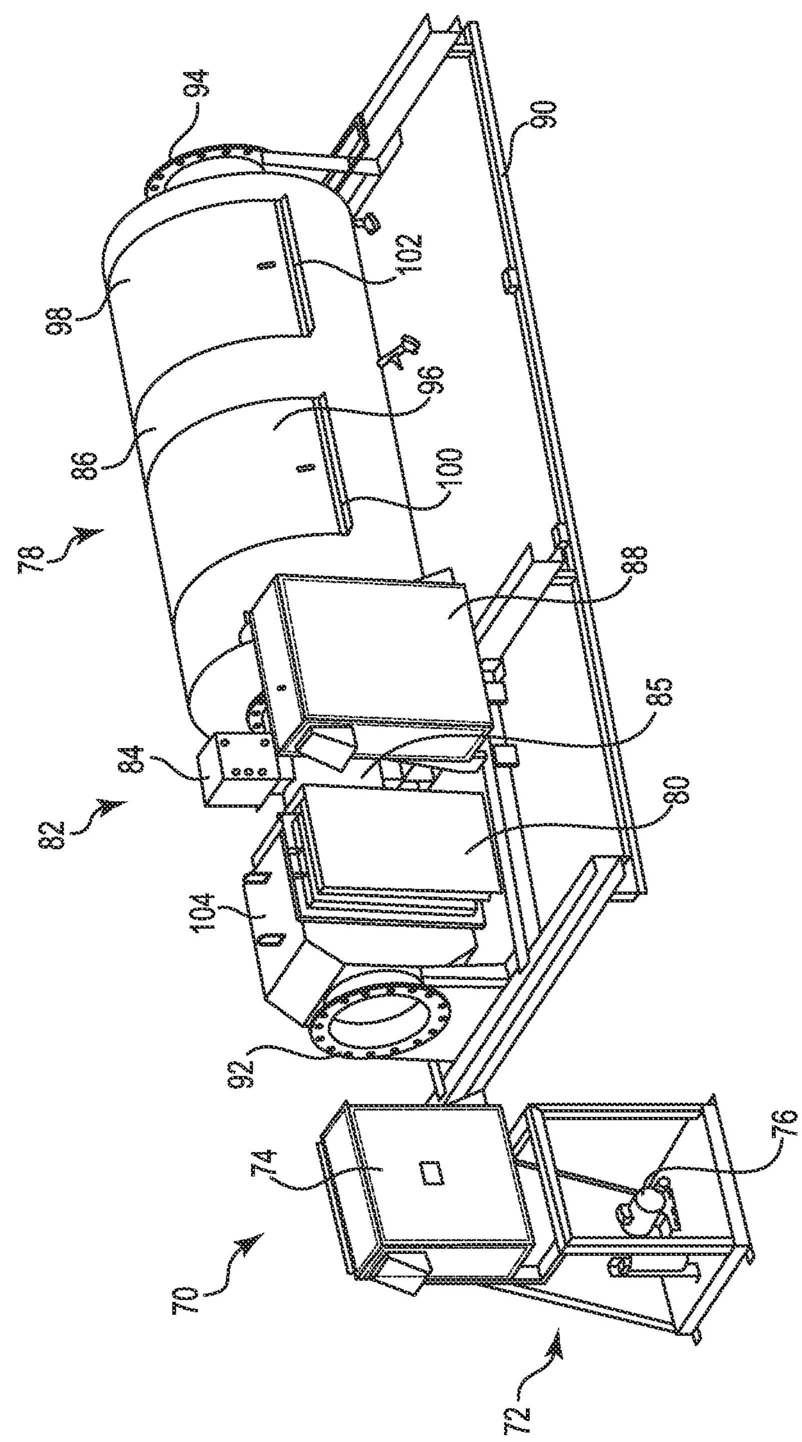
FIG. 4 is a perspective view of an exhaust aftertreatment system in accordance with embodiments of the present invention.
Figure 5:
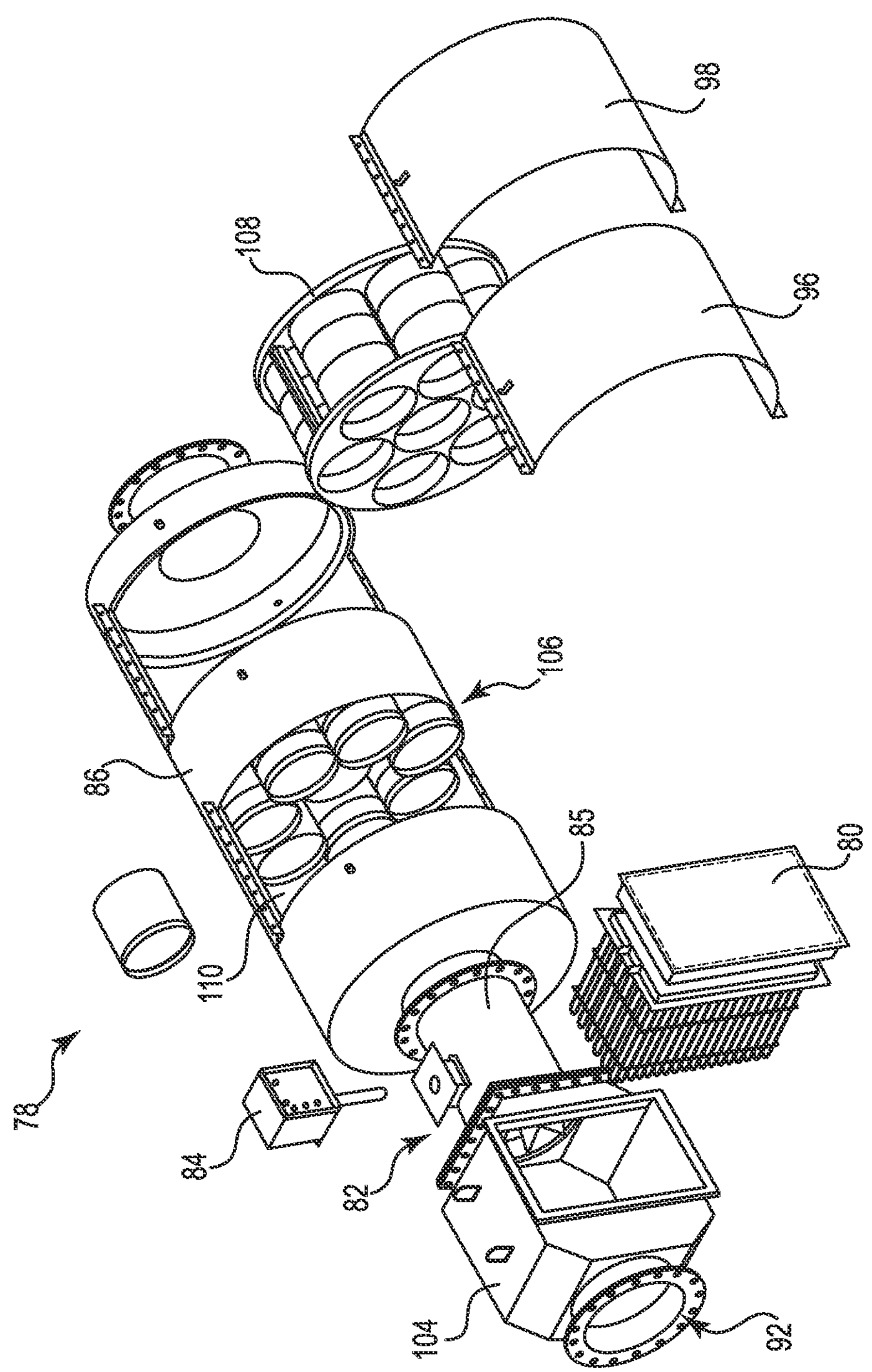
FIG. 5 is an exploded perspective view of the exhaust aftertreatment system shown in FIG. 4.
Figure 6:
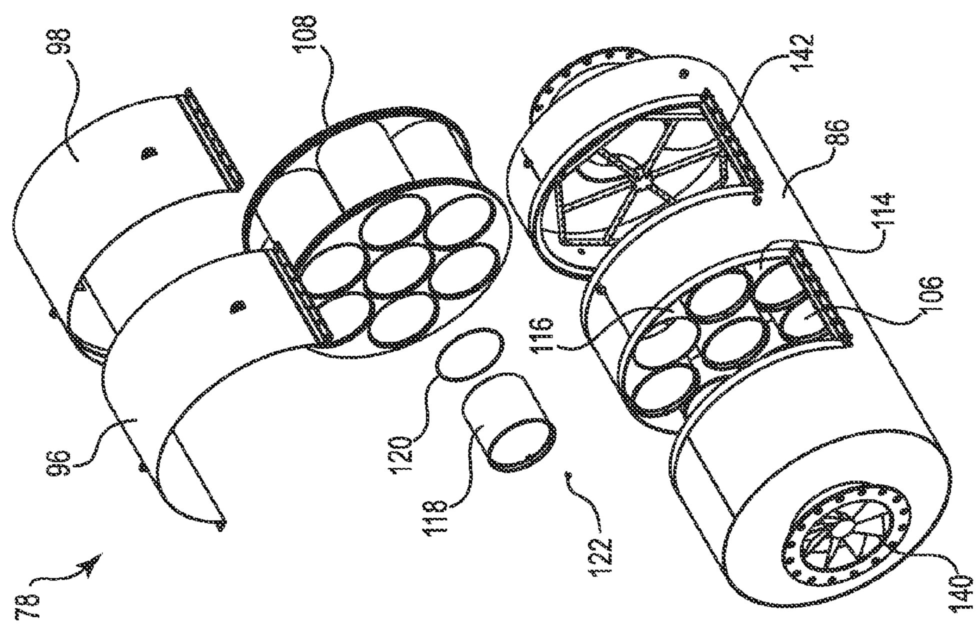
FIG. 6 is an exploded perspective view of a portion of the exhaust aftertreatment system shown in FIG. 4.
Figure 8:
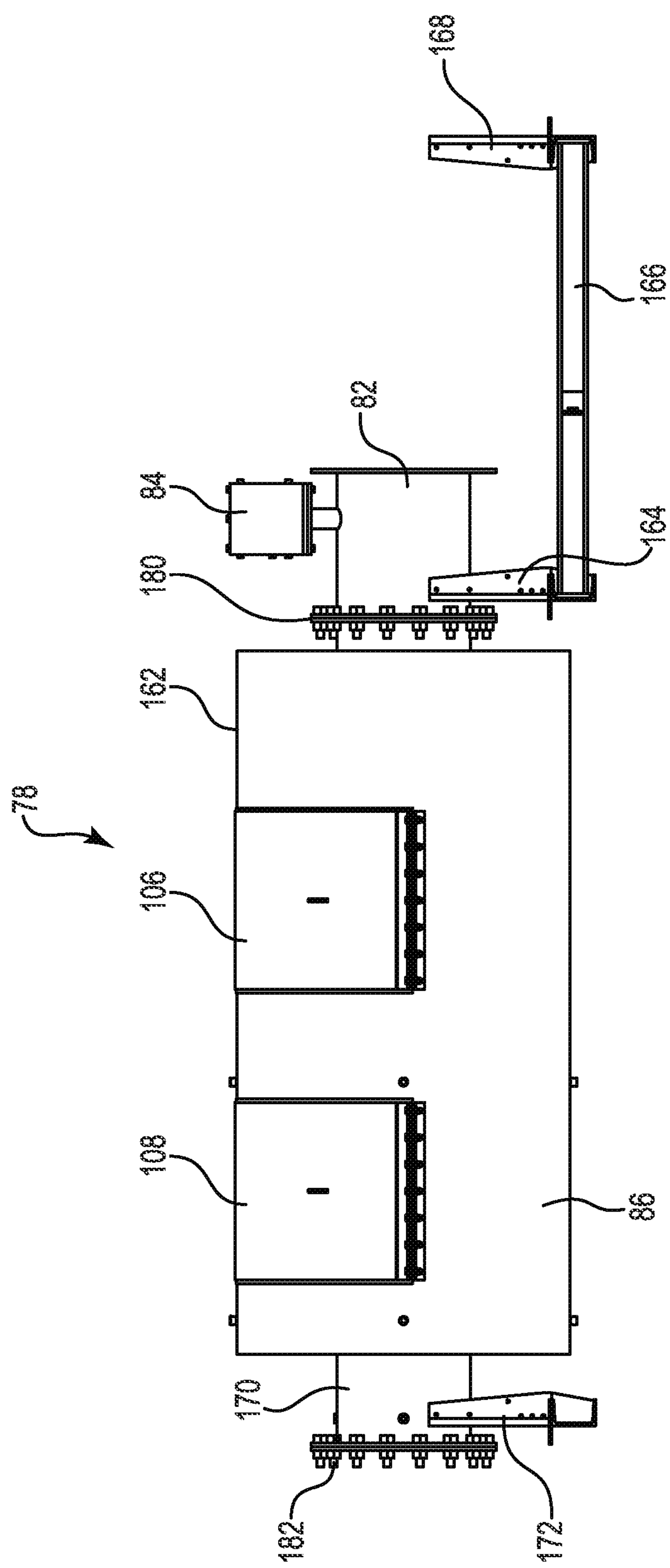
FIG. 8 is an elevation view of an exhaust aftertreatment system in accordance with embodiments of the present invention.
Figure 14:
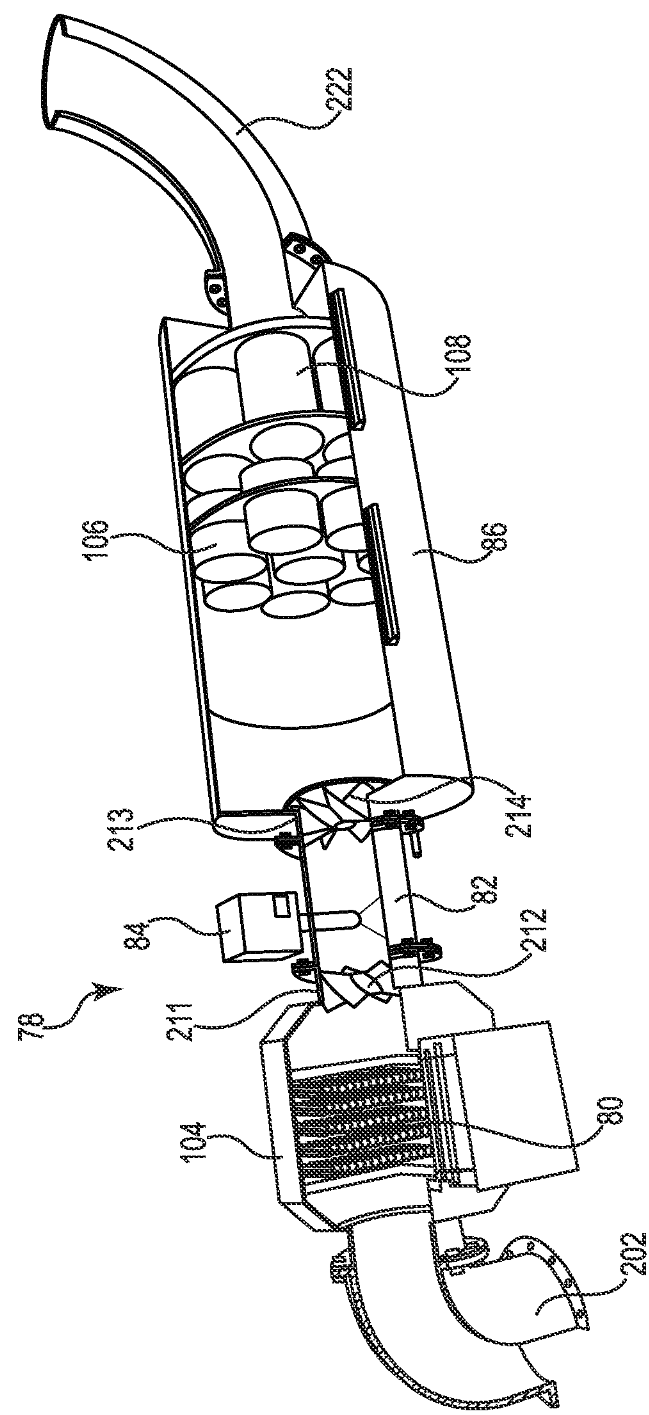
FIG. 14 is a cutaway perspective view of an exhaust aftertreatment system in accordance with embodiments of the present invention.

FIG. 4 is a perspective view of an exhaust aftertreatment system 70 that includes a control stand 72 and an exhaust treatment assembly 78, FIGS. 5 and 6 are exploded perspective views of the exhaust treatment assembly 78. FIG. 8 is side view of the exhaust treatment assembly 78 in combination with a support and FIG. 14 is a cutaway perspective view of the exhaust treatment assembly 78.

The control stand 72 includes a controller 74 that is adapted to monitor and control various functions of the aftertreatment exhaust system 70. The controller 74 controls, among other features, the flow of DEF into the exhaust treatment assembly 78. The control stand 72 also includes a DEF pump 76 that is controlled by the controller 74 and that pumps DEF from a storage tank (not illustrated) as needed.

The exhaust treatment assembly 78 includes an exhaust heater/load bank 80, a DEF injection section 82 including a DEF injector 84 and a housing 85. An exhaust heater control panel 88 monitors and controls the exhaust heater/load bank 80. The exhaust heater 80 can be disposed within a housing 104 that is secured to the upstream end of the DEF injection section 82. In the illustrated embodiment, the exhaust treatment assembly 78 is secured to a support structure 90. The support structure 90 can be configured to sit on the floor or other structure to support the exhaust treatment assembly 78. In some embodiments, such as illustrated in FIG. 1, the support structure 90 can be part of a larger support structure that holds the exhaust treatment assembly 78 above a genset such as the genset 12. The exhaust treatment assembly 78 has an exhaust inlet 92 that is configured to accept exhaust gases from a diesel engine and an exhaust outlet 94.

The housing 86 includes a DPF access door 96 and an SCR access door 98. In some embodiments, the DPF access door 96 can be attached to the housing 86 via a hinge 100 and the SCR access door 98 can be attached to the housing 86 via a hinge 102. In some embodiments, the DPF access door 96 can be bolted or otherwise secured to the housing 86. In some embodiments, the SCR access door 98 can be bolted or otherwise secured to the housing 86.

Figure 7:
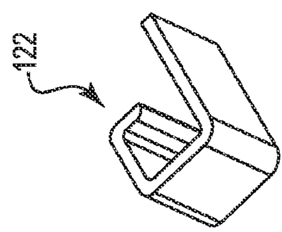
FIG. 7 is a perspective view of a mounting clip useable in an exhaust aftertreatment system in accordance with embodiments of the present invention.

A DPF assembly 106 is disposed within the housing 86, adjacent an opening 110 formed by opening or removing the DPF access door 96. Similarly, an SCR assembly 108 is disposed within the housing 86, adjacent an opening 112 formed by opening or removing the SCR access door 98. The SCR assembly 108 is installed or replaced as a unitary assembly. As shown in FIGS. 6 and 7, however, the DPF assembly 106 includes multiple individually replaceable ceramic filter sections 118.

As seen in FIGS. 6 and 7, the DPF assembly 106 includes a support structure 114 that includes a plurality of individual cylindrical supports 116. Each of the individual cylindrical supports 116 are configured to releasably accommodate a ceramic filter section 118. Each of the ceramic filter sections 118 are free of catalyst that could otherwise cause increased degradation of the DEF that is injected upstream of the DPF assembly 106 by the DEF injector 84. Each of ceramic filter section 118 is installed with an insulating O-ring 120 and is held in place with a DPF clip 122. FIG. 7 provides a detailed illustration of the DPF clip 122.

Several additional elements can be seen in FIG. 6. At a downstream end of the housing 86 adjacent to the DEF injection section 82 is a stationary upstream mixer 140. Near an opposing downstream end of the housing 86, an exhaust gas collector 142 is disposed. Each of these elements will be discussed in greater detail with respect to subsequent drawings.

Figure 10:
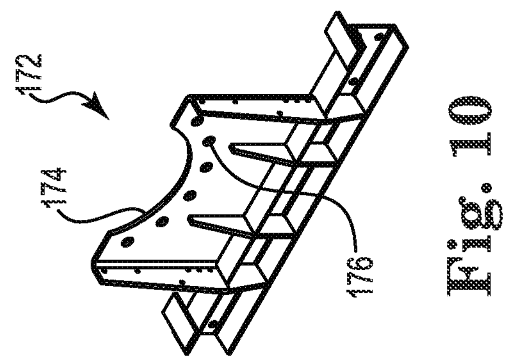
FIG. 10 is a perspective view of the end mounting saddle shown in FIG. 8.
Figure 9:
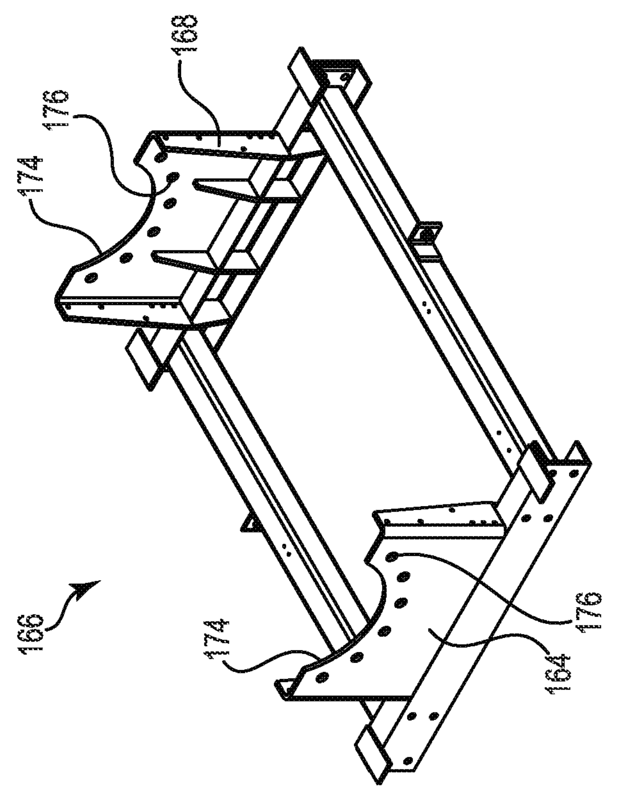
FIG. 9 is a perspective view of the mounting saddle assembly shown in FIG. 8.

FIG. 8 is a side view of the exhaust treatment assembly 78 in combination with a mounting saddle assembly 166 and a rear mounting saddle 172, illustrated in FIGS. 9 and 10. The DEF injection section 82 is bolted to an upstream end 162 of the housing 86. The DEF injection section 82 is also bolted to a downstream end 164 of the mounting saddle assembly 166. It will be appreciated that the upstream end 168 of the mounting saddle assembly 166 can be configured for securing the upstream end of an exhaust heater housing (not illustrated). A downstream end 170 of the housing 86 is bolted to the end mounting saddle 172.

The downstream end 164 of the mounting saddle assembly 166, the upstream end 168 of the mounting saddle assembly 166 and the end mounting saddle 172 each include a semicircular cutout 174 having a radius of curvature that is selected to accommodate the dimensions of the exhaust treatment assembly 78. A plurality of bolt holes 176 follow the semicircular cutouts 174 and are arranged to accommodate bolting flanges secured to the exhaust treatment assembly 78. In particular, the DEF injection section 82 includes a bolting flange 180 that is securable to the downstream end 164 of the mounting saddle assembly 166 and the downstream end 170 of the housing 86 includes a bolting flange 182 that is securable to the rear mounting saddle 172. Details are illustrated with respect to FIGS. 11-13.

Figure 13:
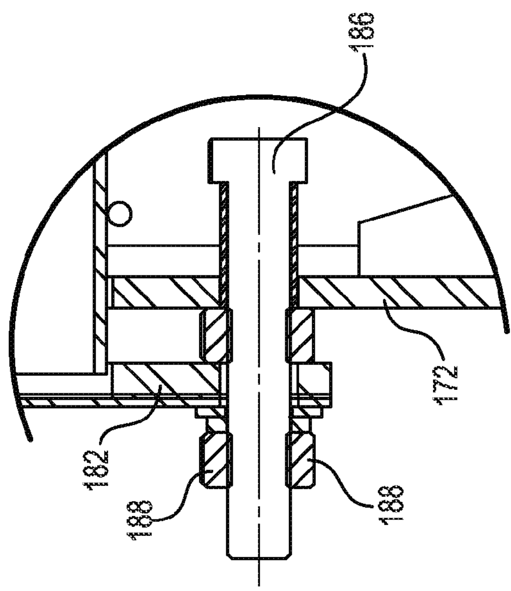
FIG. 13 is an enlarged portion of a cross-section taken along line A-A of FIG. 11, showing the rear mounting saddle assembly in a contracted position.
Figure 12:
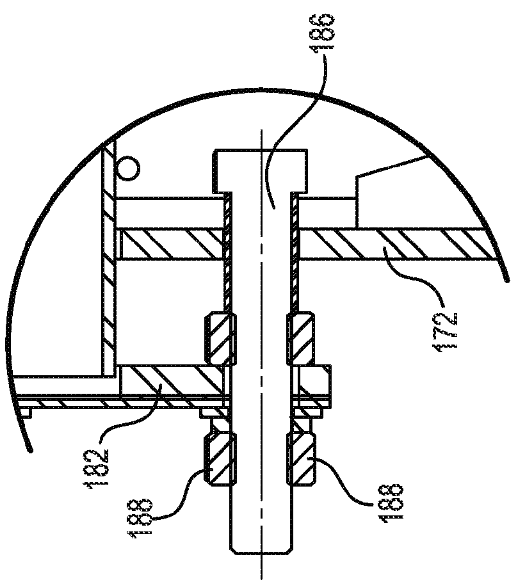
FIG. 12 is an enlarged portion of a cross-section taken along line A-A of FIG. 11, showing the rear mounting saddle assembly in an expanded position.
Figure 11:
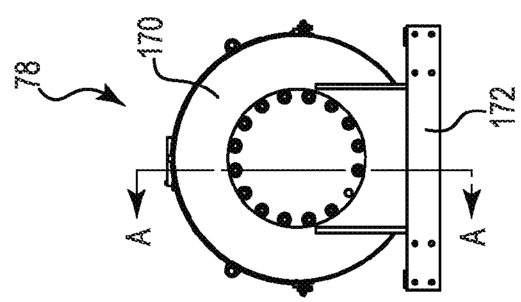
FIG. 11 is an end view of the exhaust aftertreatment system of FIG. 8.

FIG. 11 is an end view of the exhaust treatment assembly 78, showing the bolting flange 182 in combination with the rear mounting saddle 172. FIG. 12 is an enlarged view in an expanded configuration while FIG. 13 is an enlarged view in a contracted configuration. The contracted configuration shown in FIG. 13 can be considered as representing a state in which the exhaust treatment assembly 78 is relatively cool while the expanded configuration shown in FIG. 12 can be considered as representing a state in which the exhaust treatment assembly 78 is hot, and has thermally expanded in an axial direction. A plurality of bolts 186 (only one illustrated in FIGS. 12 and 13) pass between the bolting flange 182 and the rear mounting saddle 172 and engage with one or more nuts or other fasteners 186. By comparing FIGS. 12 and 13, it can be seen that the bolting flange 182 (and hence the housing 156) can move axially with respect to the rear mounting saddle 172 in order to accommodate thermal expansion and contraction of the exhaust aftertreatment system 150.

While this feature permitting axial movement of the housing 86 is illustrated with respect to the end mounting saddle 172, it will be appreciated that a similar arrangement can be employed at the downstream end 164 of the mounting saddle assembly 166. In some embodiments, a similar structure can be employed at the upstream end 168 of the mounting saddle assembly 166. In some embodiments, the upstream end 168 of the mounting saddle assembly 166 can instead be rigidly secured to the DEF injection section 82.

FIG. 14 is a cutaway perspective view of the exhaust treatment assembly 78. An exhaust inlet 202 leads to the exhaust heater housing 104. The DEF injection section 82 includes an upstream stationary mixer 212 located near an inlet 211 of the DEF injection section 82 and a downstream stationary mixer 214 located near an outlet 213 of the DEF injection section 82. In some embodiments, the upstream stationary mixer 212 can be considered as being disposed partially within the DEF injection section 82 and partially upstream of the DEF injection section 82. In some embodiments, the downstream stationary mixer 214 can be considered as being disposed partially within the DEF injection section 82 and partially downstream of the DEF injection section 82. Downstream of the DEF injection section 82 is a housing 86 that accommodates a DPF filter assembly 106 and an SCR filter assembly 108. Downstream of the housing 86 is an exhaust exit 222.

It can be seen that the housing 86 has a diameter that is greater than a diameter of the DEF injection section 82. The DPF filter assembly 106 and the SCR filter assembly 108 each have a diameter that is greater than a diameter of the DEF injection section 82 and is substantially similar to the diameter of the housing 86. In some embodiments, the diameter of the housing 86 is in the range of about 1.6 and 4.0 times larger than the diameter of the DEF injection section 82. The diameter of the DEF injection section 82 can range from about 14 inches to about 24 inches. The diameter of the housing 86 can range from about 36 inches to about 65 inches.

In some embodiments, the housing 86 can be dimensioned such that the DEF injector 84 and the SCR filter assembly 108 can be spaced by a distance of about 61 inches to about 100 inches. An overall length of the housing 86 can be in the range of about 89 inches to about 139 inches. The DPF filter assembly 106 can be positioned about 14 inches to about 18 inches away from the SCR filter assembly 108. The housing 86 can be dimensioned such that a ratio between the length of the housing 86 and the diameter of the housing 86 can be in the range of about 1.4 to about 3.7. The DEF injector section 82 can have an overall length of about 17 inches to about 35 inches in some embodiments.

Figure 15:
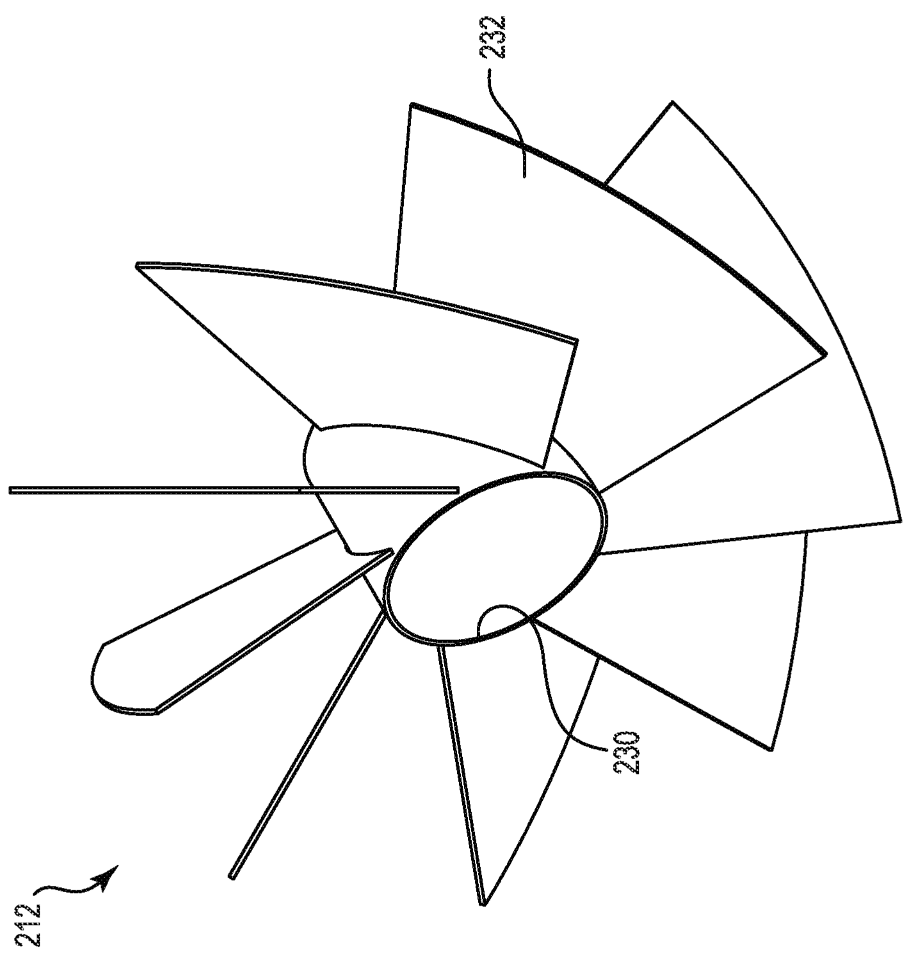
FIG. 15 is a perspective view of the stationary upstream mixer shown in FIG. 14.

FIG. 15 is a perspective view of the upstream stationary mixer 212. The upstream stationary mixer 212 has an overall diameter that is about the same as the diameter of the DEF injection section 82. The upstream stationary mixer 212 includes a tubular or open core 230 and a plurality of blades 232 extending radially from the tubular core 230. The plurality of blades 232 are angled with respect to an overall exhaust flow direction past the upstream stationary mixer 212 such that the blades 232 cause turbulence within the exhaust flow. The turbulence helps to mix the exhaust gases and the DEF being injected by the DEF injector 84. A portion of the exhaust flow will pass through the open core 230 without being redirected by the blades 232. This portion of the exhaust flow passing through the open core 230 without being redirected impinges on the distal end of the DEF injector 84 providing a smooth gas flow to inject the DEF into, minimizing disruptions to the spray pattern and helping prevent urea crystal growth. The DEF injector 84 can, for example, be configured in the manner disclosed in co-pending U.S. patent application Ser. No. 13/706,082 filed on even date herewith and entitled Diesel Exhaust Fluid Injector Assembly, the entire disclosure of which is expressly incorporated herein by reference for all purposes.

Figure 16:
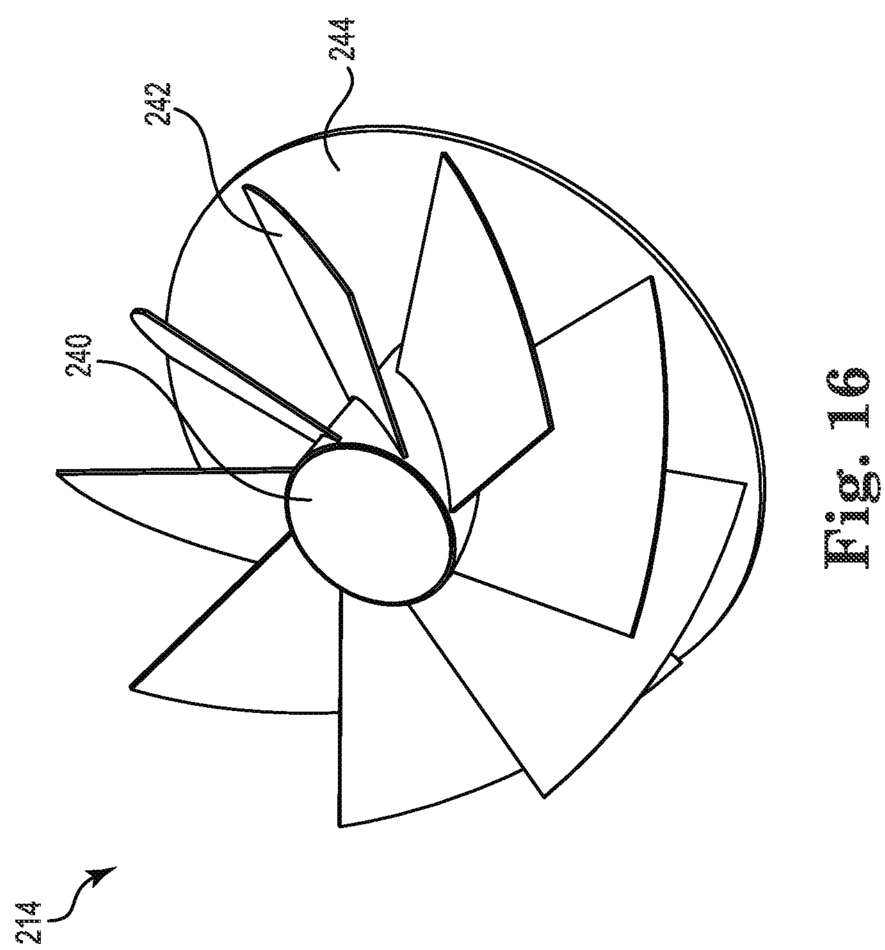
FIG. 16 is perspective view of the stationary downstream mixer shown in FIG. 14.

FIG. 16 is a perspective view of the downstream stationary mixer 214. The downstream stationary mixer 214 includes a closed core 240 and a plurality of blades 242 extending radially from the closed core 240. The plurality of blades 242 are angled with respect to an overall exhaust flow direction past the downstream stationary mixer 214 such that the blades 242 cause additional turbulence within the exhaust flow. The additional turbulence helps to mix the exhaust gases and the DEF being injected by the DEF injector 84. As will be discussed, further mixing the exhaust gases to ensure a more homogeneous mixture can improve exhaust gas sampling further downstream.

The downstream stationary mixer 214 also includes a baffle 244 that has a diameter that is substantially equal to or greater than an overall diameter of the plurality of blades 242 and is substantially equal to or greater than a diameter of the DEF injection section 208. The baffle 244 helps to redirect the flow of exhaust gases in a radially outward direction as the exhaust gases pass the downstream stationary mixer 214 and enter the housing 86 imparting a turbulence to the exhaust gas and DEF mixture as it is expanded into the larger housing 86 from the relatively smaller diameter DEF injection section 82 before contacting, in turn, the DPF filter assembly 106 and the SCR filter assembly 108.

Figure 18:
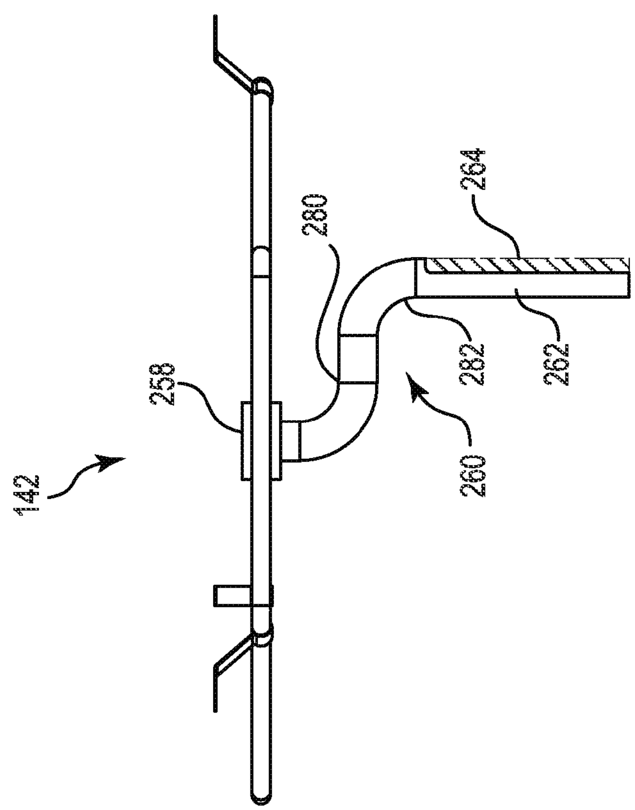
FIG. 18 is a side view of the exhaust gas collector of FIG. 17.
Figure 17:
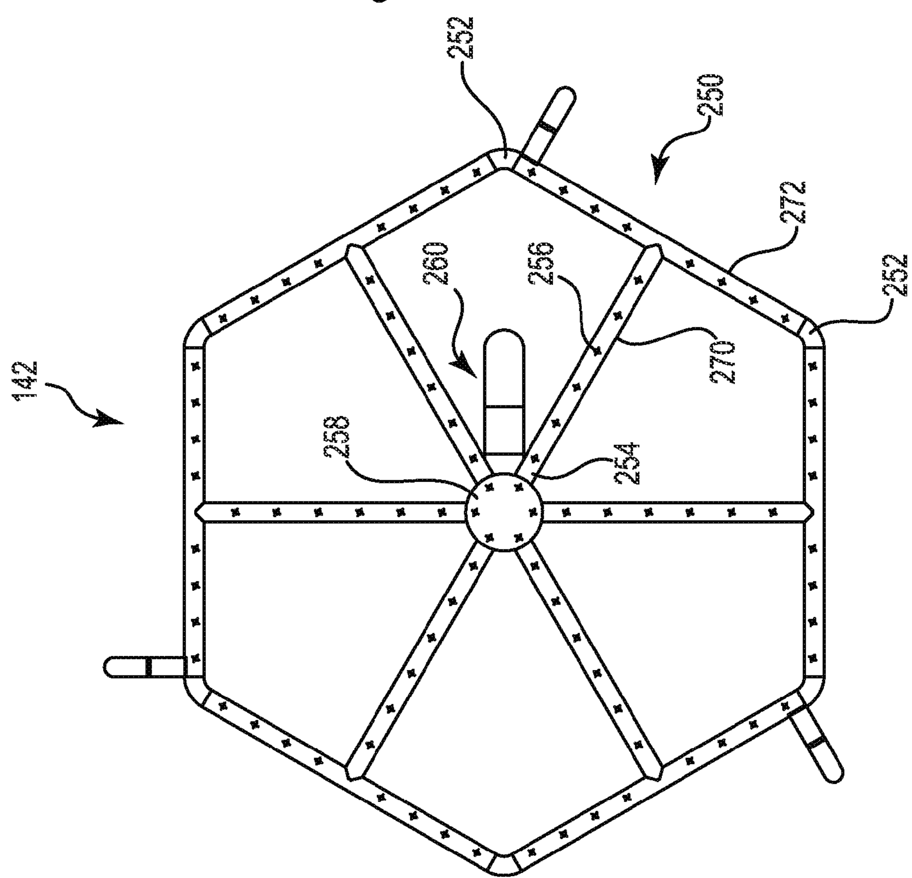
FIG. 17 is an end view of an exhaust gas collector useful in an exhaust aftertreatment system in accordance with embodiments of the present invention.

Returning briefly to FIG. 6, the exhaust treatment assembly 78 can be seen as including an exhaust gas collector 142. The exhaust gas collector 142 can be used to uniformly and evenly sample the exhaust gases passing through the exhaust treatment assembly 78 in order to better sense the level of NOx remaining in the exhaust stream after the SCR assembly 108 and allow adjustment of the dose of DEF fluid being injected and otherwise control the operation of the assembly 78, thereby improving control of NOx scrubbing. FIGS. 17 and 18 provide detailed views of the exhaust gas collector 142.

The exhaust gas collector 142 includes a plurality of tubular sample members 250, each tubular sample member 250 having closed upstream ends 252 and a downstream end 254. Each sample member 250 includes a plurality of exhaust collection holes 256 that are spaced apart along a length of the tubular sample member 250 in order to sample across a large cross-sectional area of the housing 216 (FIG. 14). The exhaust gas collector 142 includes a common collection location 258 to which the downstream ends 254 of each of the tubular sample members 250 are fluidly connected. The common collection location 258 can be centrally located within the exhaust gas collector 142. All of the exhaust gases collected by any of the plurality of exhaust collection holes 256 pass through to the common collection location 258. It is noted that in some embodiments, to further facilitate gas flow in the sample members 250, the common collection can be "set back" and located downstream from the initial cross section plane of the exhaust gas collector and the tubular sample members 250 sloped downstream to couple to it to encourage a pressure differential to drive the exhaust gas samples to the common collection location 258. It is also noted that the upstream ends 252 of the tubular sample members 250 in other embodiments can be open to the exhaust stream.

In the illustrated embodiment, each tubular sample member 250 includes a portion 270 that extends radially from the common collection location 258 and a portion 272 that extends circumferentially from the portion 270. In some embodiments, each tubular sample member 250 can be considered as being T-shaped, with a base portion (portion 270) and a cross portion (portion 272). At least some of the plurality of tubular sample members 250 are substantially identical, and are generally symmetrically positioned within the housing when the exhaust gas collector 250 is in position in the illustrated embodiment, The sample members 250 can take other forms in other embodiments (not shown). In other embodiments, the exhaust gas collector 142 is circular in shape and the upstream ends 252 of the tubular sample members 250 can be open and coupled together in fluid communication with each other.

A non-sample collecting accumulator tube 260 is fluidly coupled to the common collection location 258. The non-sample collecting accumulator tube 260 collects and further mixes the exhaust samples from all of the plurality of sample members 250 to aid in attaining an exemplary exhaust sample that has been averaged from across the diameter of the exhaust gas collector 142. The non-sample collecting accumulator tube 260 includes an open portion 262 that is configured to accommodate a sensor 264. In some embodiments, the sensor 264 is a NOx sensor. When the exhaust gas collector 142 is positioned within the housing 86 (as seen in FIG. 6), the non-sample collecting accumulator tube 260 is radially centrally located within the housing and extends in a downstream direction from the rest of the exhaust gas collector 142 providing a differential pressure from the flow of exhaust gas across the length of the exhaust gas collector 142 from the exhaust collection holes 256 to the open portion 264 to drive and mix the exhaust sample to the sensor 264.

The non-sample collecting accumulator tube 260 can be considered as including a first portion 280 having a length that extends radially from the common collection location 258 and a second portion 282 having a length that extends from the first portion 280 generally parallel to a flow of exhaust gas. The sensor 264 senses the mixed exhaust gas in the second portion 282 of the non-sample collecting accumulator tube 260 at a location spaced from the first portion 280. It is noted that in one embodiment the exhaust gas collector 142 contains a rotating selector or other valving mechanism in the common collection location 258 allowing the exhaust gas collector 142 to sample from one or more selected tubular sample members 250 enabling sampling of exhaust gases from selected elements of the SCR assembly 108.

It will be appreciated that features and elements of one of the exhaust aftertreatment systems 20 (FIG. 1), 28 (FIG. 2), 50 (FIG. 3), 70 (FIG. 4) and 78 (FIGS. 5, 8 and 14) described herein may be combined or otherwise added to another of the exhaust aftertreatment systems 20 (FIG. 1), 28 (FIG. 2), 50 (FIG. 3), 70 (FIG. 4), 78 (FIGS. 5, 8 and 14). These exhaust systems are not necessarily intended to be described as distinctly different structures, but rather may be considered, at least in part, as being different views or embodiments. Although certain dimensions and dimensional relationships are given, other embodiments of the invention have other dimensions and dimensional relationships.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. An exhaust aftertreatment system, comprising: a duct having an inlet region, an outlet region, and a cross sectional area; an exhaust gas collector in the duct, including: a plurality of tubular sample members having upstream ends, downstream ends and one or more spaced apart exhaust collection holes, wherein the downstream ends of the tubular members are fluidly coupled at a common collection location, the tubular members are positioned in the duct with the exhaust collection holes at locations distributed across the cross sectional area and are adapted to collect exhaust samples from the one or more exhaust collection holes from across the cross sectional area of the duct; a non-sample collecting accumulator tube having a first portion fluidly coupled to the common collection location with a length extending radially from the common collection location, wherein the non-sample collecting accumulator tube and common collection location are adapted to mix and convey the exhaust gas samples collected from all of the plurality of sample members to a second portion of the non-sample collecting accumulator tube that is placed in the duct at a location relative to the radially extending portion of the first portion that is downstream relative to the flow of gas in the duct, and wherein all exhaust gas samples conveyed in the non-sample collecting accumulator are collected by the plurality of sample members having the downstream ends coupled to the common collection location; and a sensor to sense the mixed exhaust gas in the accumulator tube.

2. The exhaust aftertreatment system of claim 1 wherein at least some or all of the plurality of tubular sample members are substantially identical.

3. The exhaust aftertreatment system of claim 2 wherein at least some or all of the tubular sample members are generally symmetrically positioned in the duct.

4. The exhaust aftertreatment system of claim 3 wherein at least some or all of the tubular sample members are coupled at a common collection location that is generally centered in the cross sectional area of the duct.

5. The exhaust aftertreatment system of claim 4 wherein at least some or all of the tubular sample members have a portion extending radially from the common collection location.

6. The exhaust aftertreatment system of claim 5 wherein at least some or all of the tubular sample members have a portion extending generally circumferentially from the radially extending portions.

7. The exhaust aftertreatment system of claim 5 wherein the common collection location and downstream ends of the tubular sample members are located generally downstream in the duct from the upstream ends of the tubular sample members.

8. The exhaust aftertreatment system of claim 4 wherein the tubular sample members include generally T-shaped members having a base portion and a cross portion, and wherein the base portions extend radially from the common collection location and the cross portions extend generally circumferentially.

9. The exhaust aftertreatment system of claim 4 wherein:

the second portion of the accumulator tube has a length that extends from the first portion generally parallel to a flow of exhaust gas; and the sensor senses the mixed exhaust gas in the second portion of the accumulator tube at a location spaced from the first portion.

10. The exhaust aftertreatment system of claim 9 wherein the second portion of the accumulator tube has a downstream end that opens into the duct.

11. The exhaust aftertreatment system of claim 1 wherein the common collection location is generally centered in the cross sectional area of the duct.

12. The exhaust aftertreatment system of claim 1 and further including a valve to selectively couple at least some of the tubular sample members to the common collection location.

13. The exhaust aftertreatment system of claim 1 wherein at least some of the tubular sample members have closed upstream ends.

14. The exhaust aftertreatment system of claim 1, wherein each of the exhaust collection holes includes an open end configured to receive the exhaust gas, and the open end of each exhaust collection hole is open to the duct and flush with the tubular sample members.

15. The exhaust aftertreatment system of claim 1, wherein the sensor senses at least one of $NO_x$ and $O_2$ within the mixed exhaust gas.

16. An exhaust aftertreatment system, comprising:

a duct having an inlet region, an outlet region, and a cross sectional area;

an exhaust gas collector in the duct, including:

a common collection location generally centrally located in the duct;

a plurality of tubular sample members to collect exhaust gas samples and direct the samples to the common collection location, each sample member including:

a first portion fluidly coupled to and extending radially from the common collection location;

at least one second portion fluidly coupled to the first portion, the second portion extending from the first portion in a generally circumferential direction in the duct; and spaced apart exhaust collection holes in the first and second portions, wherein the sample members are positioned in the duct with the exhaust collection holes at locations distributed across the cross sectional area to collect exhaust samples from across the cross sectional area of the duct, and all exhaust gas samples collected at the common collection location are collected by the plurality of sample members;

an accumulator tube fluidly coupled to the common collection location including:

a first portion having a length that extends radially from the common collection location; and a second portion having a length and an open downstream end, wherein the second portion extends axially from the first portion and the open downstream end is located in an exhaust flow; and a sensor to sense the mixed exhaust gas in the second portion of the accumulator tube.

17. The exhaust aftertreatment system of claim 16 wherein the tubular sample members include a plurality of generally T-shaped member symmetrically arranged around the common collection location.

18. An exhaust aftertreatment system, comprising: a duct having an inlet region, an outlet region, and a cross sectional area; an exhaust gas collector in the duct, including: a common collection location generally centrally located in the duct; a plurality of tubular sample members extending from and fluidly coupled to the common collection location, to collect exhaust gas samples and direct the samples to the common collection location, wherein the plurality of tubular sample members includes a portion that extends circumferentially within the duct; and spaced apart exhaust collection holes in the sample members, wherein the sample members are positioned in the duct with the exhaust collection holes at locations distributed across the cross sectional area to collect exhaust samples from across the cross sectional area of the duct, and all exhaust gas samples collected at the common collection location are collected by the plurality of tubular sample members; an accumulator tube fluidly coupled to the common collection location, wherein the exhaust samples collected from all of the plurality of sample members are mixed in the accumulator tube; and a sensor to sense the mixed exhaust gas in the accumulator tube, wherein the sensor is within the duct.

19. The exhaust aftertreatment system of claim 18 wherein:

the accumulator tube includes a first portion having a length that extends radially from the common collection location and a second portion having a length that extends from the first portion generally parallel to a flow of exhaust gas (axially); and the sensor senses the mixed exhaust gas in the second portion of the accumulator tube at a location spaced from the first portion.

20. The exhaust aftertreatment system of claim 18 and further including a valve to selectively couple at least some of the tubular sample members to the common collection location.

* * * * *